(12) United States Patent
Kim et al.

(10) Patent No.: US 7,611,797 B2
(45) Date of Patent: Nov. 3, 2009

(54) LITHIUM SECONDARY BATTERY WITH SAFETY DEVICE

(75) Inventors: Chang-Seob Kim, Cheonan (KR); Su-Jin Han, Cheonan (KR); Min-Ho Gong, Cheonan (KR); Jun-Won Kang, Cheonan (KR); Soo-Youn Maeng, Incheon (KR); Ju-Hyung Kim, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 741 days.

(21) Appl. No.: 10/737,837

(22) Filed: Dec. 18, 2003

(65) Prior Publication Data

US 2004/0126651 A1 Jul. 1, 2004

(30) Foreign Application Priority Data

Dec. 26, 2002 (KR) ............... 10-2002-0084075

(51) Int. Cl.
*H01M 2/34* (2006.01)
*H01M 10/48* (2006.01)
*H01M 2/12* (2006.01)
*B23K 20/10* (2006.01)

(52) U.S. Cl. ............... 429/62; 429/170; 429/161; 429/82; 429/56; 429/90

(58) Field of Classification Search ............... None
See application file for complete search history.

(56) References Cited

U.S. PATENT DOCUMENTS

| | | | | |
|---|---|---|---|---|
| 4,929,518 A | * | 5/1990 | Yoshinaka et al. | 429/54 |
| 5,976,729 A | * | 11/1999 | Morishita et al. | 429/65 |
| 6,492,058 B1 | * | 12/2002 | Watanabe et al. | 429/121 |
| 6,709,785 B2 | * | 3/2004 | Lee et al. | 429/153 |
| 6,929,879 B2 | * | 8/2005 | Yamazaki | 429/158 |
| 6,936,374 B2 | | 8/2005 | Ehara | |

FOREIGN PATENT DOCUMENTS

| | | |
|---|---|---|
| CN | 1380713 | 11/2002 |
| JP | 08-77995 | 3/1996 |
| JP | 8-329908 | 12/1996 |
| JP | 09-320565 | 12/1997 |
| JP | 09-330696 | 12/1997 |
| JP | 11-170069 | 6/1999 |
| JP | 11170069 A * | 6/1999 |
| JP | 2002-313295 | 10/2002 |

OTHER PUBLICATIONS

U.S. Appl. No. 10/727,714, filed Dec. 5, 2003, Ju-hyung Kim, Samsung SDI Co., Ltd.

(Continued)

*Primary Examiner*—Patrick Ryan
*Assistant Examiner*—Keith Walker
(74) *Attorney, Agent, or Firm*—Stein McEwen, LLP

(57) ABSTRACT

A lithium secondary battery includes a can made of a conductive metal. The can houses an electrode unit having positive and negative electrode plates with a separator interposed therebetween with an electrolytic solution. An upper opening of the can is sealed by a cap assembly. A bottom plate is welded to an outer bottom surface of the can, and a lead plate having a first end welded to the outer bottom surface of the can and a second end connected to a safety device so that the can is electrically connected to the safety device.

25 Claims, 8 Drawing Sheets

OTHER PUBLICATIONS

U.S. Appl. No. 10/743,866, filed Dec. 24, 2003, Eui-Sun Hong, Samsung SDI Co., Ltd.

Office Action issued on Apr. 6, 2007 by the Chinese Intellectual Property Office for Chinese Patent Application No. 200310124455.6.

* cited by examiner

LITHIUM SECONDARY BATTERY WITH SAFETY DEVICE

CROSS-REFERENCE TO RELATED APPLICATION

This application claims the benefit of Korean Patent Application No. 2002-84075, filed on Dec. 26, 2002 in the Korean Intellectual Property Office, the disclosure of which is incorporated herein in its entirety by reference.

BACKGROUND OF THE INVENTION

1. Field of the Invention

The present invention relates to a lithium secondary battery, and more particularly, a lithium secondary battery having an improved electrical connection structure between a safety device of the battery and a can.

2. Description of the Related Art

In general, lithium secondary batteries are rechargeable and can be made into a smaller size with high capacity. The lithium secondary batteries are widely used in advanced electronic devices, such as mobile phones, camcorders, notebook type computers and the like because of their various advantages, including high operating voltage and high-energy density.

A lithium secondary battery generally has a generation element comprising a positive electrode plate, a negative electrode plate and a separator, (i.e., an electrode unit), and an electrolytic solution. The generation unit is disposed in a can. The can is made of aluminum or aluminum alloy. A cap assembly seals an upper opening of the can. The can is made of aluminum or an aluminum alloy because aluminum is lightweight, which is advantageous in attaining lightweight batteries. Aluminum is also highly resistant to corrosion even when it is used for a long time at high voltages when compared to iron or other conductive metals. The lithium secondary battery generally has an electrode terminal formed at its upper portion and insulated from the can. The electrode terminal serves as a first electrode of the battery. In this case, the can of the battery (e.g., the bottom surface of the battery) serves as a second electrode of the battery.

In the event of external short-circuit or internal short-circuit due to mechanical impacts or overcharging, the lithium secondary battery is prone to rupture due to a sharp increase in the voltage of the battery. To avoid such a danger, the lithium secondary battery is generally electrically connected to a safety device, such as a positive temperature coefficient (PTC) element, a thermal fuse or a protecting circuit, and then encased in a battery pack. Such a safety device prevents rupture of a battery by interrupting the current flow when the voltage of the battery sharply increases.

The safety device of a battery is connected to the positive and negative electrodes of the battery through a lead. The lead is generally made of nickel, a nickel alloy or nickel-plated stainless steel to provide a predetermined level of hardness and conductivity. However, a lead made of nickel or a nickel alloy may cause several problems when it is welded to a can made of aluminum or an aluminum alloy. In other words, the infusibility of nickel makes it difficult to perform ultrasonic welding, and the high electrical, thermal conductivity of aluminum makes it difficult to perform resistance welding due to difficulty of gaining intensive heat at the contact interface. Thus, laser welding may be employed. During laser welding, however, laser beams may be transferred to the safety device, resulting in poor reliability.

To overcome the above problems, as shown in FIG. 1, an example of which is disclosed in U.S. Pat. No. 5,976,729, a cell having a safety device such as a protector 4 is connected thereto such that a bottom plate 2 made of nickel or a nickel alloy is laser-welded to a bottom surface 1a of a can 1 made of aluminum or an aluminum alloy. A lead 3 is welded to the bottom plate 2 with a welding device 5 by resistance welding. However, according to the disclosed cell, since the bottom plate 2 used in connecting the lead 3 is made of nickel or a nickel alloy having relatively higher electrical resistance than aluminum, a voltage drop of the overall battery may increase due to an increase in electrical resistance.

Also, since there is no specific basis for a welding position of the lead 3 when the lead 3 is welded to the bottom plate 2, it is necessary to constantly maintain the welding position of the lead 3, which involves an additional step and deteriorates workability.

SUMMARY OF THE INVENTION

Accordingly, an aspect of the invention provides a protector having an improved connection structure for minimizing a voltage drop of the battery and reducing the welding workability during welding between a can and a lead.

Additional aspects and/or advantages of the invention will be set forth in part in the description which follows and, in part, will be obvious from the description, or may be learned by practice of the invention.

A lithium secondary battery according to an aspect of the present invention includes a can made of a conductive metal, the can accommodating an electrolytic solution and an electrode unit having positive and negative electrode plates with a separator interposed therebetween, a cap assembly which seals an upper opening of the can, a bottom plate welded to an outer bottom surface of the can, and a lead unit which electrically connects terminals of the can and having a lead plate having one end welded to the outer bottom surface of the can and another other end connected to a safety device so that the can is electrically connected to the safety device.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
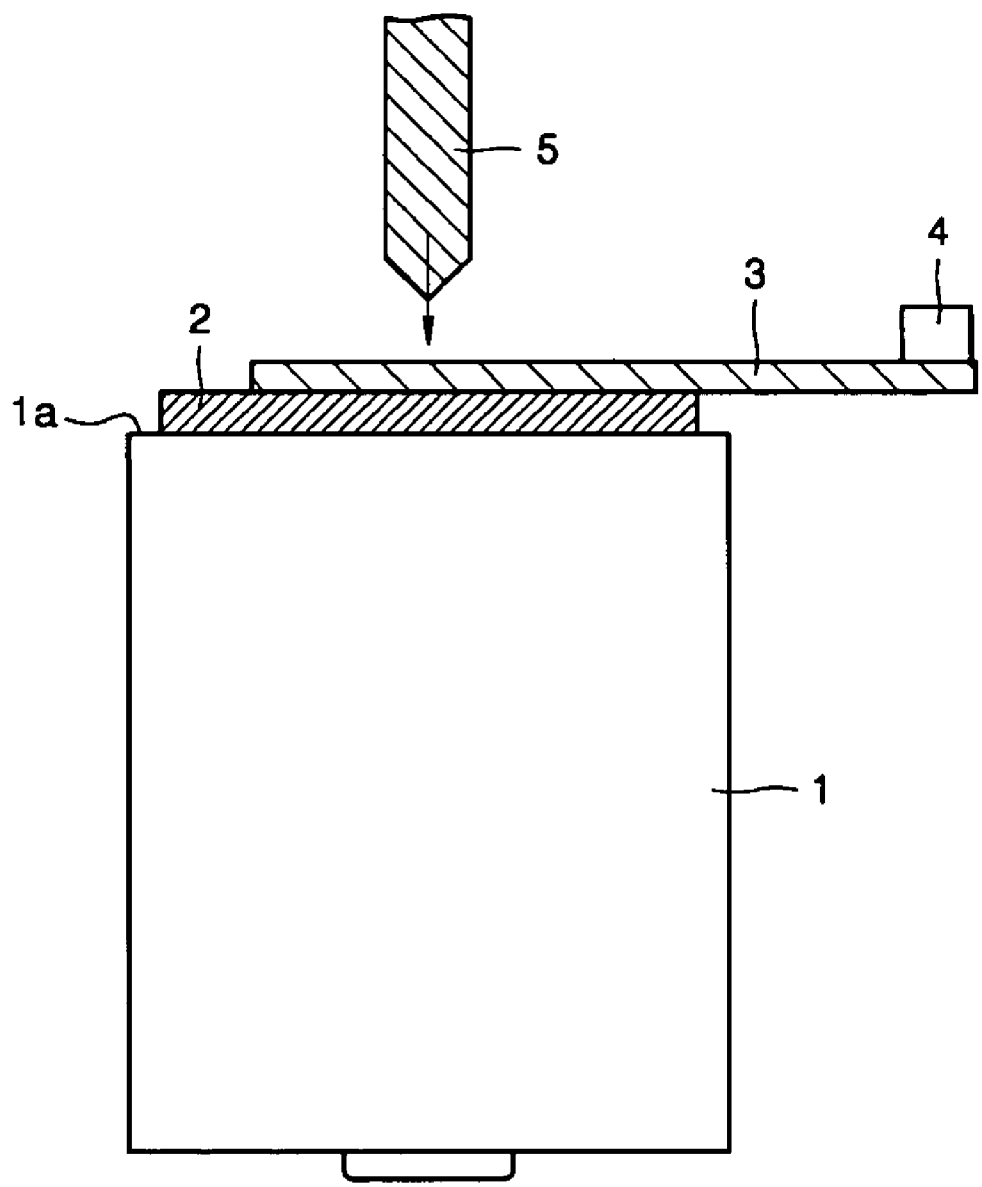
FIG. 1 is a cross-sectional view illustrating a conventional secondary battery.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
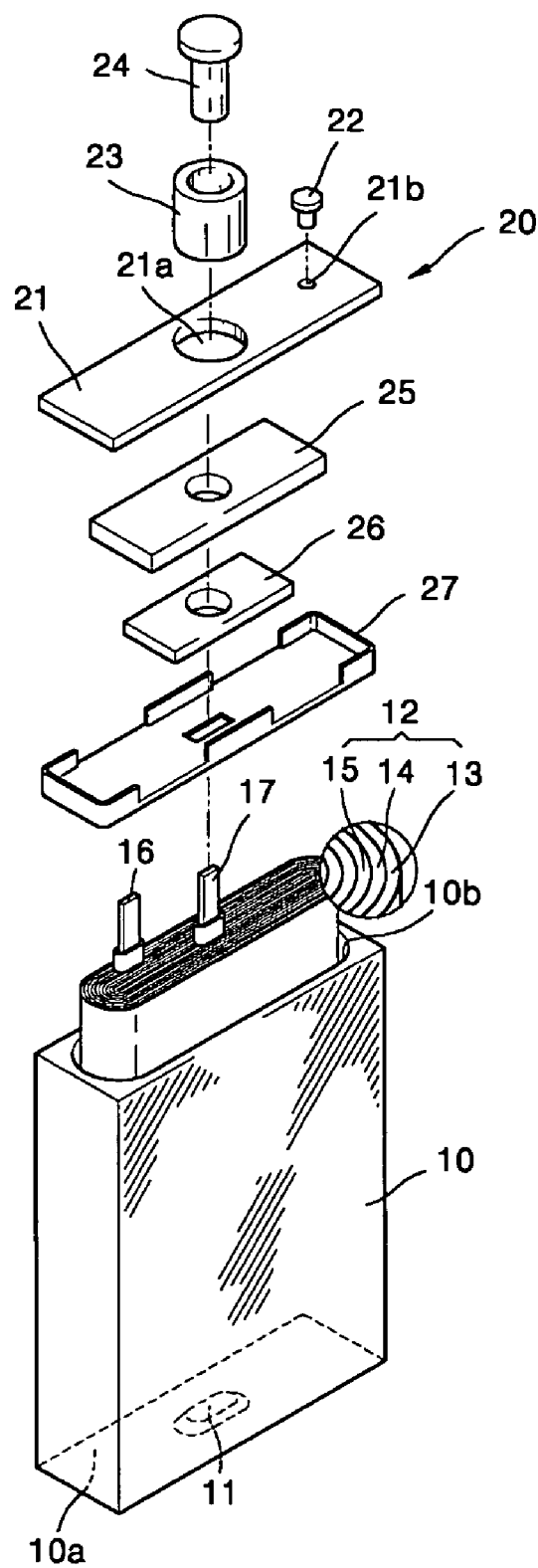
FIG. 2 is an exploded perspective view of a lithium secondary battery according to an embodiment of the present invention.
Figure 3:
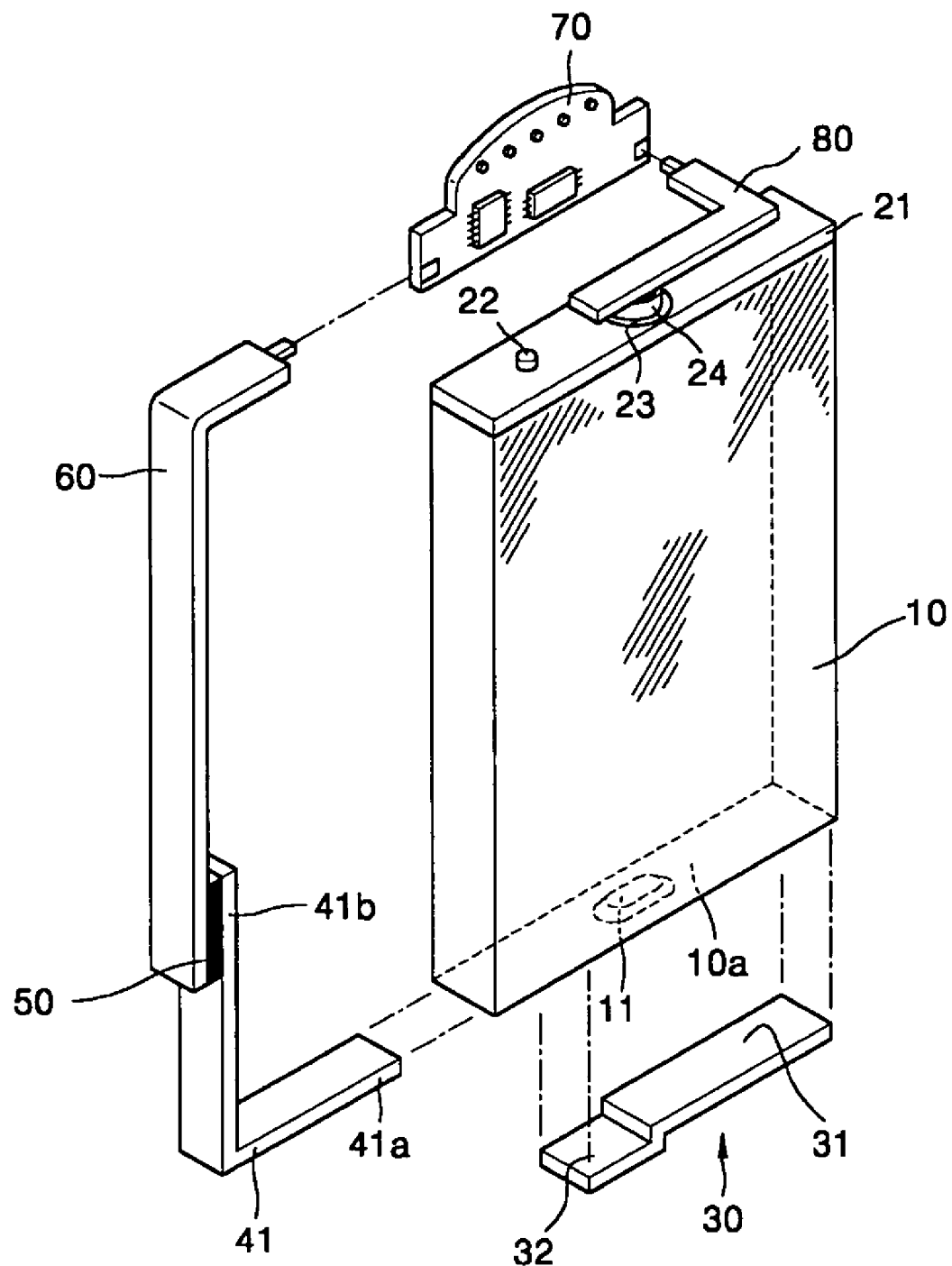
FIG. 3 is an exploded perspective view of the lithium secondary battery shown in FIG. 2 having a safety device connected thereto.

As shown in FIGS. 2 and 3, a lithium secondary battery according to an embodiment of the present invention includes a can 10, an electrode unit 12 accommodated inside the can 10, and a cap assembly 20 sealing an upper opening 10b of the can 10. A safety device is provided at one side of the can 10. While the shown safety device is a positive temperature coefficient (PTC) element (PTC) 50 and a protecting circuit 70, it is understood that both the protecting circuit 70 and the PTC 50 need not be used in all aspects of the invention. Lead plates 41, 60 and 80 electrically connect a positive electrode terminal (that is, a bottom surface 10a of the can 10) with the PTC 50, the PTC 50 with the protecting circuit 70, and a negative electrode terminal 24 with the protecting circuit 70, respectively so as to form an electrical connection between the terminals 24, 10a which passes through the safety device.

The can 10 may be formed of substantially rectangular metal, and can serve as a terminal itself according to aspects of the invention. The can 10 may be formed of aluminum, which is a light, conductive metal, or an aluminum alloy according to aspects of the invention. As shown in FIG. 2, the can 10 has one plane opened (i.e., an opening 10b). An electrode unit 12 is accommodated inside the can 10 through the opening 10b. A safety vent 11 is provided at a central portion of the outer bottom surface 10a of the can 10. The safety vent 11 has a predetermined size and is thinner than other parts of the can 10. The vent 11 is first ruptured when the internal pressure increases due to overcharging, thereby ensuring safety of the battery.

The electrode unit 12 includes a positive electrode plate 13, a negative electrode plate 15 and a separator 14. The separator 14 is disposed between the positive electrode plate 13 and the negative electrode plate 15. The resultant stacked structure is wound in a jelly-roll type. A positive electrode lead 16 is welded to the positive electrode plate 13, and an end of the positive electrode lead 16 protrudes upward from the electrode unit 12. Also, a negative electrode lead 17 is welded to the negative electrode plate 15, and an end of the negative electrode lead 17 also protrude upward from the electrode unit 12. However, other types of electrode units 12 can be used which are not jelly roll type stacked structures.

A cap plate 21 is provided in the cap assembly 20. The cap plate 21 is a metal plate having the size and shape corresponding to a size of the opening 10b of the can 10. A terminal throughhole 21a having a predetermined size is formed at the center of the cap plate 21. An electrode terminal (e.g., a negative electrode terminal 24) is inserted into and disposed at the terminal throughhole 21a. A tubular gasket 23, which insulates between the negative electrode terminal 24 and the cap plate 21, is installed at the outer surface of the negative electrode terminal 24. A terminal plate 26 is installed under the insulation plate 25. The bottom of the negative electrode terminal 24 is electrically connected to the terminal plate 26. An insulation case 27, which insulates between the electrode unit 12 and the cap assembly 20, is installed above the electrode unit 12. After the cap assembly 20 is welded to the opening 10b of the can 10, an electrolytic solution is injected into the electrode unit 12 through an inlet 21b formed at the cap plate 2 and sealed using a plug 22. It is further understood that a solid electrolyte could be used instead of or in addition to the electrolytic solution.

Figure 4:
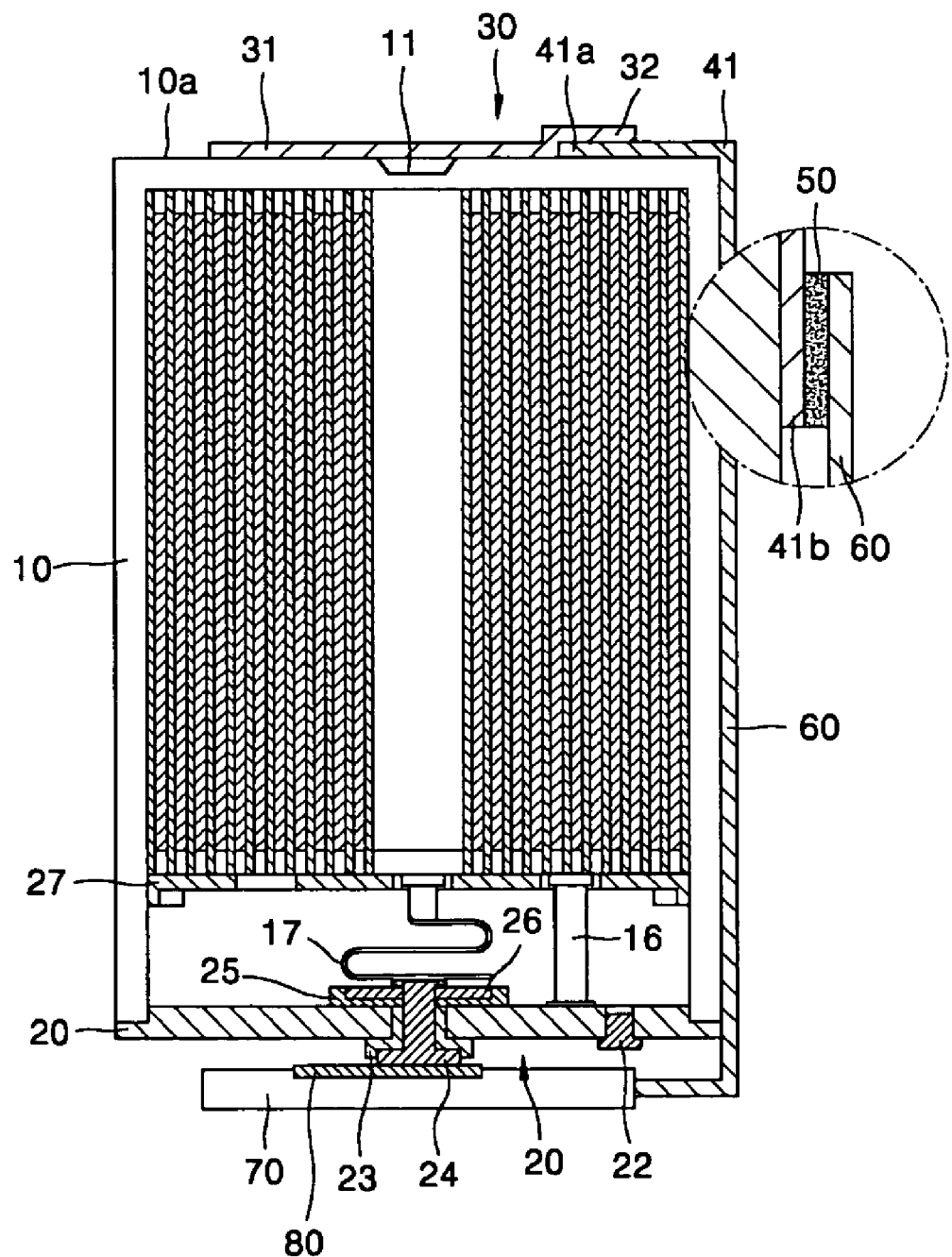
FIG. 4 is an exploded perspective view of a connection structure of the safety device shown in FIG. 3.

In the sealed lithium secondary battery, as shown in FIGS. 3 and 4, the outer bottom surface 10a of the can 10 serves as a positive electrode terminal. The PTC 50 is electrically connected by the lead plate 41 to the outer bottom surface 10a for interrupting a current induced due to increased resistance when the temperature rises. The PTC 50 is electrically connected to an outer bottom 10a of the can 10 through the lead plate 41 and is electrically connected to a protecting circuit 70 for preventing overcharging and overdischarging through the lead plate 60. The protecting circuit 70 and the negative electrode terminal 24 are also electrically connected to each other through the lead plate 80. However, the electrical connection structures shown in FIGS. 3 and 4 are provided for illustration only, and only one of the protecting circuit 70 and the PTC 50 need be employed according to embodiments of the invention.

In the lithium secondary battery having the above-described structure, the bottom plate 30 is welded to the outer bottom 10a of the can 10. In order to protect the outer bottom 10a of the can 10 where the safety vent 11 is formed, the bottom plate 30 has a size and a width that can cover the bottom surface 10a. The bottom plate 30 can be made of a highly conductive metal plate, for example, nickel or a nickel alloy.

In one embodiment of the present invention, the lead plate 41 is directly welded to the outer bottom surface 10a of the can 10. That is, the lead plate 41 directly electrically connects the can 10 and the safety device without the bottom plate 30 made of nickel, which is relatively poor in conductivity compared to aluminum. Thus, it is possible to reduce a voltage drop of the battery due to resistance of the bottom plate 30.

In an aspect of the present invention shown in FIGS. 3 and 4, one end 41a of the lead plate 41 is disposed between the outer bottom surface 10a of the can 10 and the bottom plate 30. To this end, the bottom plate 30 includes a weld portion 31 welded to the outer bottom surface 10a of the can 10, and an accommodating portion 32 accommodating the end 41a of the lead plate 41 between the same and the outer bottom surface 10a of the can 10.

As also shown in FIGS. 3 and 4, the accommodating portion 32 extends from the weld portion 31 in a bent manner. Thus, when the lead plate 41 is welded to the outer bottom surface 10a of the can 10, the weld location of the lead plate 41 is constantly maintained by the bottom plate 30, thereby improving workability. The structures of the accommodating portion 32 shown in FIGS. 3 and 4 are provided for illustration only. That is, any structure that can accommodate the end 41a of the lead plate 41 can be used as the structure of the accommodating portion 32. As such, it is assumed that the end 41a can have a shape which fits into a receiving portion of the bottom plate 30 to maintain the end 41a, such as a dovetail type joint, such that the end 41a is not necessarily between the bottom plate 30 and the bottom surface 10a.

The lead plate 41 can be made of nickel, which is relatively poor in electrical, thermal conductivity compared to aluminum, or a nickel alloy. Here, resistance welding may be applied between the accommodating portion 32 of the bottom plate 30 and the lead plate 41 and between the outer bottom surface 10a of the can 10 and the lead plate 41. The resistance welding makes welding between the accommodating portion 32 of the bottom plate 30 made of nickel and the lead plate 41 made of nickel relatively stronger than welding between the outer bottom surface 10a of the can 10 made of aluminum and the lead plate 41. Also, since upper and lower portions of the lead plate 41 are welded to the bottom plate 30 and the outer bottom surface 10a of the can 10, respectively, stable welding between the can 10 and the lead plate 41 can be ensured, improving reliability.

Also, the lead plate 41 can be made of aluminum having higher weldability than nickel, or an aluminum alloy. Here, ultrasonic welding may be applied between the accommodating portion 32 of the bottom plate 30 and the lead plate 41 and between the outer bottom surface 10a of the can 10 and the lead plate 41. The ultrasonic welding makes welding between the outer bottom surface 10a of the can 10 made of aluminum and the lead plate 41 relatively stronger than welding between the accommodating portion 32 of the bottom plate 30 made of nickel and the lead plate 41 made of nickel. Since upper and lower portions of the lead plate 41 are welded to the bottom plate 30 and the outer bottom surface 10a of the can 10, respectively, stable welding between the can 10 and the lead plate 41 can be ensured, improving reliability.

Figure 5:
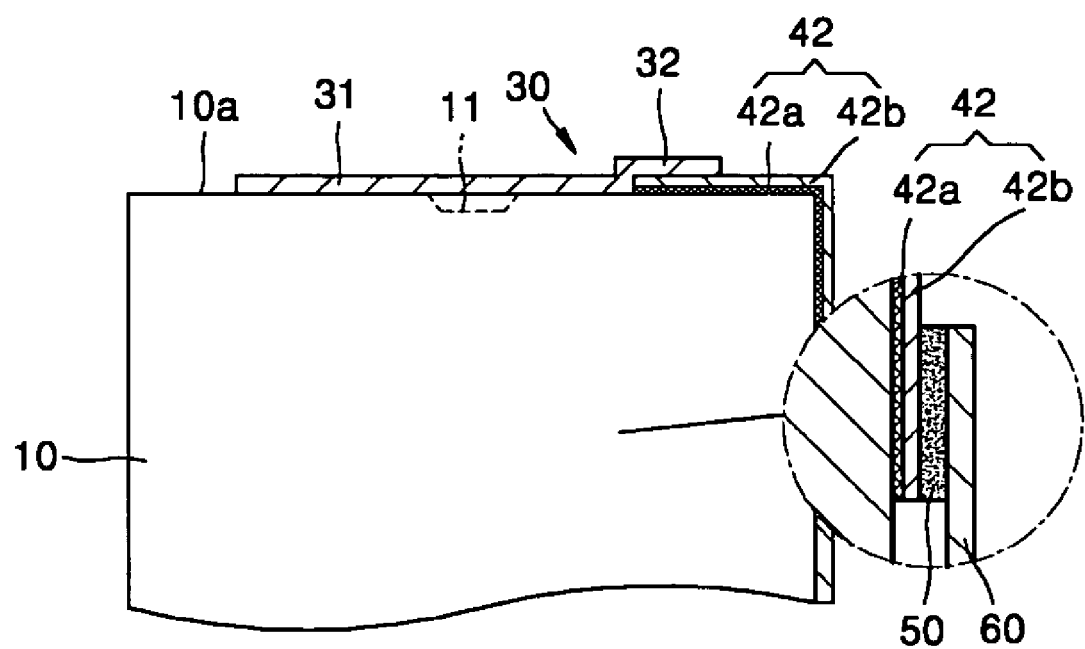
FIG. 5 is a cross-sectional view illustrating another example of the safety device shown in FIG. 4.

FIG. 5 is a cross-sectional view showing another example of the lead plate shown in FIG. 4, in which the same reference numerals as in FIG. 4 denote the same elements and an explanation thereof will not be given. As shown in FIG. 5, a lead plate 42 includes a clad layer 42a welded to the outer bottom surface 10a of the can 10 and made of aluminum or an aluminum alloy. The lead plate 42 further includes a lead layer 42b formed on the clad layer 42a, welded to the bottom plate 30 and made of nickel or a nickel alloy.

Ultrasonic welding may be applied between the accommodating portion 32 of the bottom plate 30 and the lead layer 42b of the lead plate 42 and between the outer bottom surface 10a of the can 10 and the clad layer 42a of the lead plate 42. The ultrasonic welding makes welding between the outer bottom surface 10a of the can 10 made of aluminum and the clad layer 42a of the lead plate 42 relatively stronger than welding between the accommodating portion 32 of the bottom plate 30 made of nickel and the lead layer 42b of the lead plate 41 made of nickel. Since both upper and lower portions of the lead plate 42 are welded to the bottom plate 30 and the outer bottom surface 10a of the can 10, respectively, stable welding between the can 10 and the lead plate 42 can be ensured, improving reliability.

Resistance welding may also be applied between the accommodating portion 32 of the bottom plate 30 made of nickel and the lead layer 42b of the lead plate 41 made of nickel and between the outer bottom surface 10a of the can 10 made of aluminum and the clad layer 42a of the lead plate 42. Since the accommodating portion 32 of the bottom plate 30 made of nickel is strongly welded to the lead layer 42b of the lead plate 41, stable welding between the bottom plate 30 and the lead plate 42 can be ensured.

Figure 6:
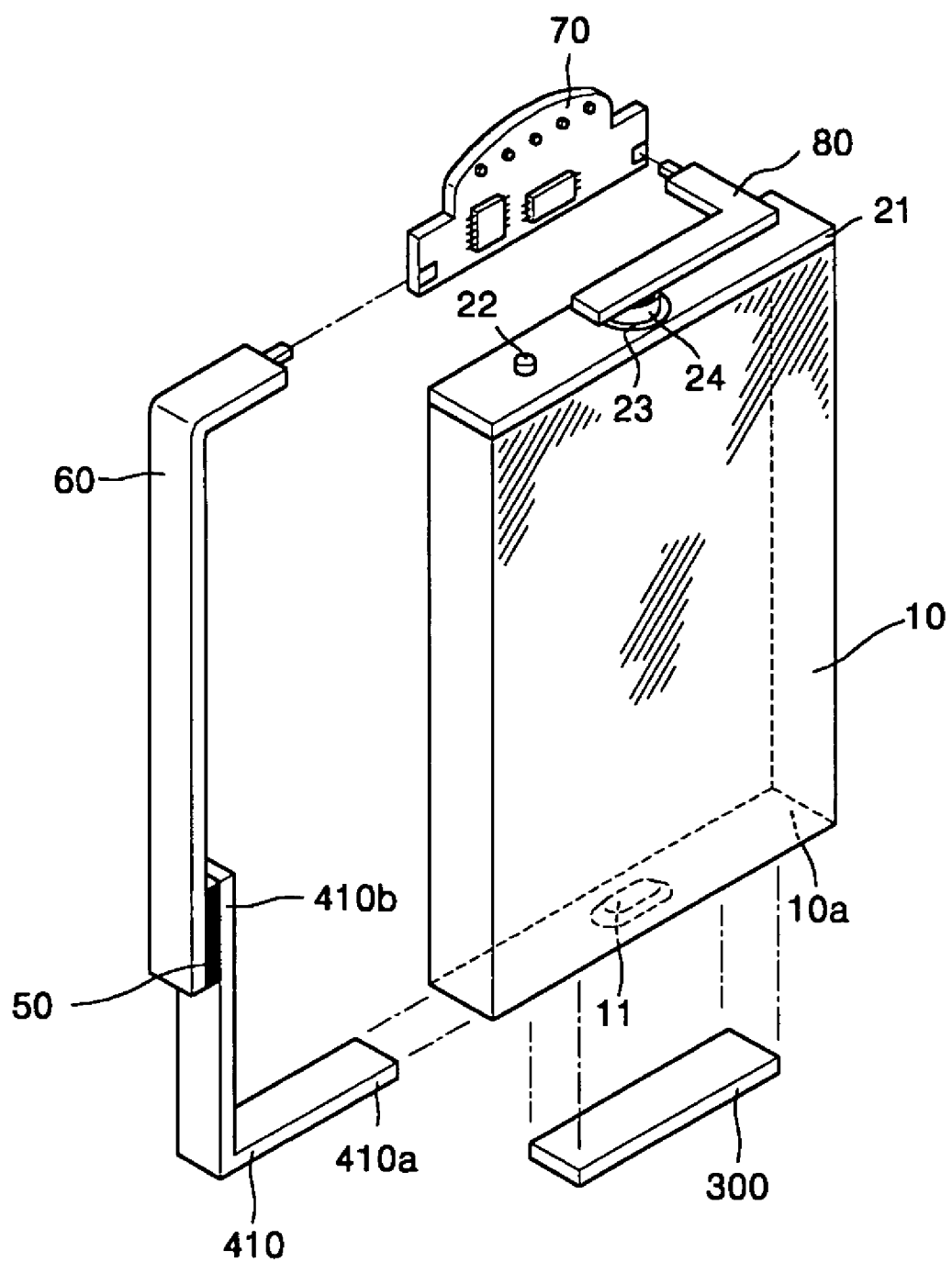
FIG. 6 is an exploded perspective view of a lithium secondary battery according to another embodiment of the present invention.
Figure 7:
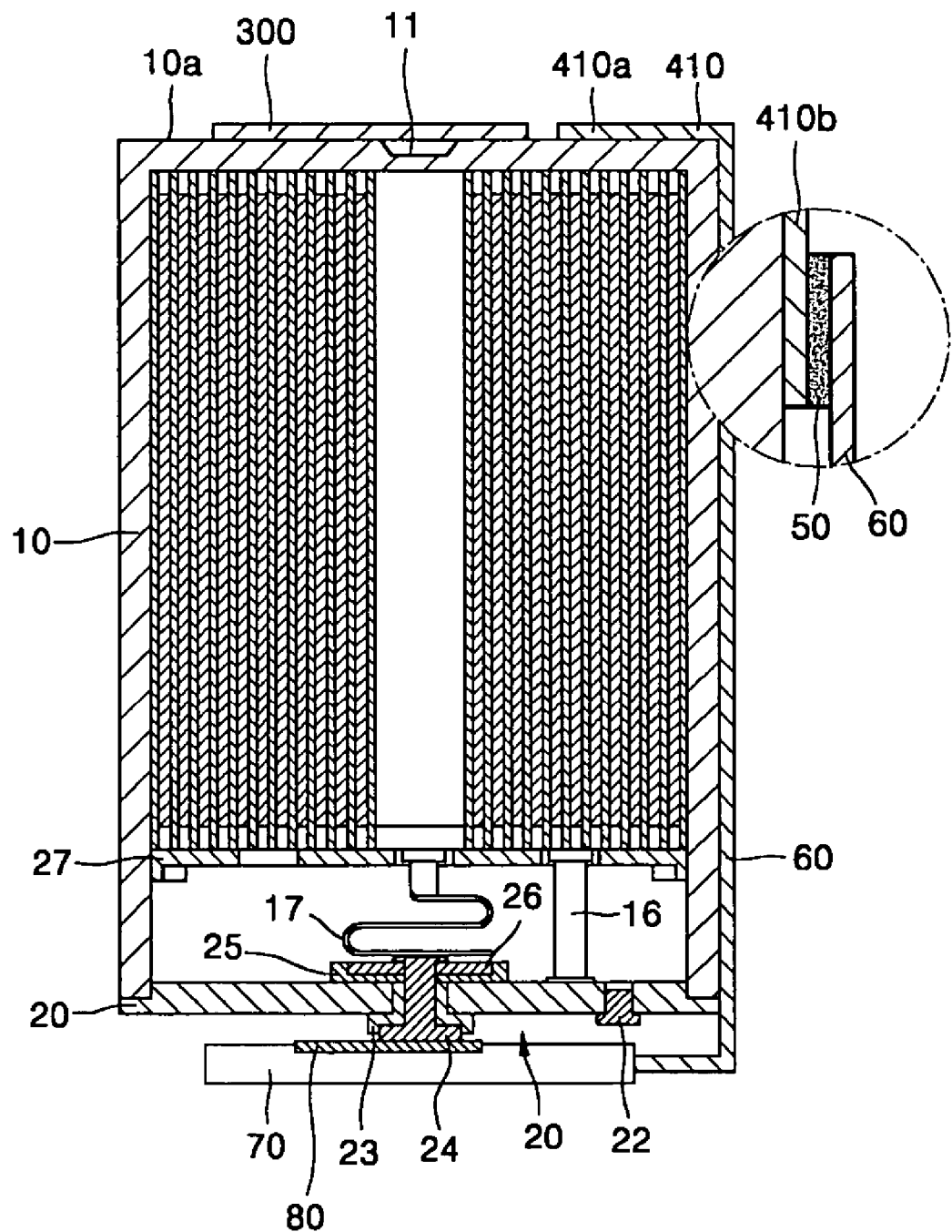
FIG. 7 is a cross-sectional view of a connection structure of a safety device shown in FIG. 6.

Now, another embodiment of the present invention will now be described with reference to FIG. 6. FIG. 6 is an exploded perspective view of a lithium secondary battery according to another embodiment of the present invention, and FIG. 7 is a cross-sectional view of a connection structure of a safety device shown in FIG. 6. Here, the same reference numerals as in FIGS. 3 and 4 denote the same elements and an explanation thereof will not be given.

Referring to the drawings, a lead plate 410 and a bottom plate 300 are separated from each other and welded to the outer bottom surface 10a of the can 10. In other words, one end 410a of the lead plate 410 and the bottom plate 300 are not contacted to each other but are welded to the outer bottom surface 10a of the can 10. The can 10 can be made of aluminum or an aluminum alloy. Also, the bottom plate 300 protects the outer bottom surface 10a of the can 10 where the safety vent 11 is formed, and can be made of nickel or a nickel alloy. The other end 410b of the lead plate 410 is electrically connected to a safety device such as a PTC element 50.

Here, the lead plate 410 can be made of an aluminum having higher weldability than nickel, or an aluminum alloy. Here, ultrasonic welding may be applied between the outer bottom surface 10a of the can 10 and the lead plate 410 made of aluminum. The ultrasonic welding makes welding between the outer bottom surface 10a of the can 10 made of aluminum and the lead plate 410 made of aluminum sufficiently strong, thereby ensuring stable welding therebetween.

Figure 8:
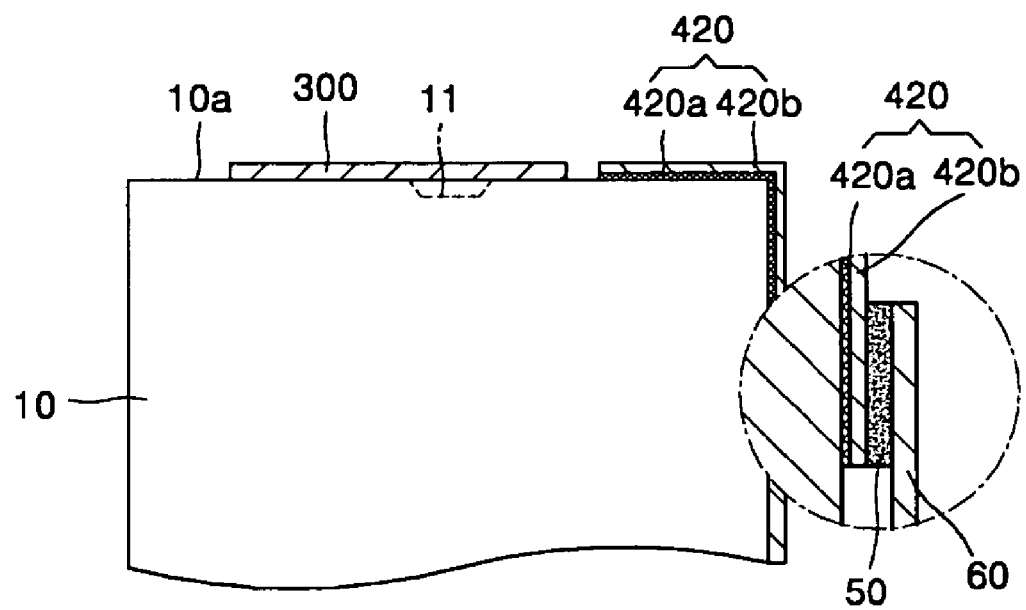
FIG. 8 is a cross-sectional view illustrating another example of the safety device shown in FIG. 7.

FIG. 8 is a cross-sectional view illustrating another example of the safety device shown in FIG. 7, in which the same reference numerals as in FIG. 7 denote the same elements and an explanation thereof will not be given. As shown, a lead plate 420 includes a clad layer 420a welded to the outer bottom surface 10a of the can 10 and made of aluminum or an aluminum alloy, and a lead layer 420b formed on the clad layer 420a and made of nickel or a nickel alloy.

Ultrasonic welding may be applied between the outer bottom surface 10a of the can 10 and the clad layer 420a of the lead plate 420. The ultrasonic welding makes welding between the outer bottom surface 10a of the can 10 made of aluminum and the clad layer 420a of the lead plate 410 made of aluminum sufficiently strong, thereby ensuring stable welding therebetween.

While described in terms of specific welding techniques by way of example, it is understood that other welding techniques could be used and/or other attachment mechanisms could be used.

As described above, the lithium secondary battery having the protector according to aspects of the present invention has the following and/or other advantages. Since a can and a lead plate are directly welded to each other, a voltage drop of the battery can be minimized according to an aspect of the invention. Since the end of the lead plate is disposed between an accommodating portion of the bottom plate and an outer bottom surface of the can for welding and a location for the welding between the lead plate and the can is determined by the bottom plate, workability can be increased according to an aspect of the invention. Since the end of a lead plate is disposed between the bottom plate and the outer bottom plate of the can for welding and both upper and lower portions of the end of the lead plate are welded, weldability can be increased, improving reliability according to an aspect of the invention.

While this invention has been particularly shown and described with reference to embodiments thereof, it will be understood by those skilled in the art that various changes in form and details may be made therein without departing from the spirit and scope of the invention as defined by the accompanying claims and equivalents thereof.

What is claimed is:

1. A lithium secondary battery comprising:
a can made of a conductive metal in which an electrode unit having a positive electrode plate and a negative electrode plate with a separator interposed therebetween is housed with an electrolytic solution, an outer bottom surface of the can serving as a first terminal electrically connected to one of the positive electrode plate or the negative electrode plate, and an upper opening of the can that is sealed by a cap assembly and has a second terminal electrically connected to the other one of the positive electrode plate or the negative electrode plate;
a safety vent formed in the bottom surface of the can;
a bottom plate welded to the outer bottom surface of the can and positioned to protect the safety vent;
a safety device; and
a lead unit that electrically connects the first and second terminals through the safety device, the lead unit comprising a lead plate having one end directly welded to the outer bottom surface of the can and another end directly connected to the safety device so that the can is electrically connected to the safety device, wherein the bottom plate includes a weld portion welded to the outer bottom surface of the can, and an accommodating portion accommodating the one end of the lead plate between the accommodating portion and the outer bottom surface of the can and directly contacting the one end of the lead plate, and wherein the accommodating portion extends from the weld portion in a bent manner such that the lead plate fits between the outer bottom surface and the accommodating portion.

2. The lithium secondary battery of claim 1, wherein the can is made of aluminum or an aluminum alloy.

3. The lithium secondary battery of claim 2, wherein the lead plate is made of nickel or a nickel alloy.

4. The lithium secondary battery of claim 3, wherein a first weld is applied between the lead plate and the bottom plate using resistance welding and a second weld is applied between the lead plate and the outer bottom surface of the can using resistance welding.

5. The lithium secondary battery of claim 2, wherein the lead plate is made of aluminum or an aluminum alloy.

6. The lithium secondary battery of claim 5, wherein a first weld is applied between the lead plate and the bottom plate using ultrasonic welding and a second weld is applied between the lead plate and the outer bottom surface of the can using ultrasonic welding.

7. The lithium secondary battery of claim 2, wherein the lead plate includes a clad layer made of aluminum or an aluminum alloy and a lead layer formed on the clad layer and made of nickel or a nickel layer.

8. The lithium secondary battery of claim 7, wherein a first weld is applied between the lead layer and the bottom plate and a second weld is applied between the clad layer and the outer bottom surface of the can using resistance welding or ultrasonic welding.

9. A lithium secondary battery comprising:
a generation element which generates electrical power;
a can which houses the generation element and which has a first surface and a second surface, the first surface comprising a first terminal electrically connected to the generation element and the second surface comprising a second terminal electrically connected to the generation element;
a safety vent formed in the first surface of the can;
a first plate welded to the first surface of the can and positioned to protect the safety vent;
a safety device; and
a lead unit which electrically connects the first terminal and the second terminal through the safety device and having a lead plate with one end disposed between the first surface and the first plate and welded directly to the first surface, and another end connected directly to the safety device,
wherein the first plate includes a weld portion welded to the first surface, and an accommodating portion accommodating the one end of the lead plate between the accommodating portion and the first surface and directly contacting the one end of the lead plate, and
wherein the accommodating portion has a bent portion that extends from the weld portion to form a gap between the first surface and the bent portion such that the lead plate fits in the gap between the first surface and the accommodating portion.

10. The lithium secondary battery of claim 9, wherein the can comprises aluminum or an aluminum alloy.

11. The lithium secondary battery of claim 10, wherein the lead plate comprises nickel or a nickel alloy.

12. The lithium secondary battery of claim 11, wherein a first weld is applied between the lead plate and the first plate using resistance welding and a second weld is applied between the lead plate and the first surface using resistance welding.

13. The lithium secondary battery of claim 10, wherein the lead plate comprises aluminum or an aluminum alloy.

14. The lithium secondary battery of claim 13, wherein a first weld is applied between the lead plate and the first plate using ultrasonic welding and a second weld is applied between the lead plate and the first surface using ultrasonic welding.

15. The lithium secondary battery of claim 10, wherein the lead plate includes a clad layer comprising aluminum or an aluminum alloy and a lead layer formed on the clad layer and comprising nickel or a nickel layer.

16. The lithium secondary battery of claim 15, wherein a first weld is applied between the lead layer and the first plate and a second weld is applied between the clad layer and the first surface using resistance welding or ultrasonic welding.

17. A lithium secondary battery comprising:
a generation element which generates electrical power;
a can which houses the generation element and which has a first surface and a second surface, the first surface comprising a first terminal electrically connected to the generation element, and the second surface comprising a second terminal electrically connected to the generation element;
a safety vent formed in the first surface of the can;
a first plate attached to the first surface of the can and positioned to protect the safety vent;
a safety device; and
a lead unit which electrically connects the first terminal and the second terminal through the safety device and having a lead plate with one end welded directly to the first surface and another end directly connected to the safety device
wherein the can comprises a first material, and
the lead plate comprises:
a first layer disposed adjacent the can which comprises the first material, and
a second layer comprising a second material other than the first material.

18. The lithium secondary battery of claim 17, wherein the one end of the lead plate is disposed between a portion of the first plate and the first surface.

19. The lithium secondary battery of claim 18, wherein the portion of the first plate overlaps the one end of the lead plate.

20. The lithium secondary batter of claim 18, wherein a first weld is disposed between the lead plate and the first surface and a second weld is disposed between the lead plate and the portion of the first plate.

21. The lithium secondary battery of claim 17, wherein a portion of the first plate overlaps the one end of the lead plate.

22. The lithium secondary battery of claim 21, wherein the portion of the first plate has a shape which receives the one end of the lead plate so as to maintain the lead plate when the one end of the lead plate is being attached to the first surface.

23. The lithium secondary battery of claim 17, wherein the first plate does not overlap the one end of the lead plate.

24. The lithium secondary battery of claim 17, wherein the first material comprises aluminum and the second material comprises nickel.

25. The lithium secondary battery of claim 17, wherein:
the first plate comprises the second material.

* * * * *

UNITED STATES PATENT AND TRADEMARK OFFICE
CERTIFICATE OF CORRECTION

PATENT NO. : 7,611,797 B2
APPLICATION NO. : 10/737837
DATED : November 3, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this

Twelfth Day of October, 2010

David J. Kappos
*Director of the United States Patent and Trademark Office*